US011212152B2

(12) United States Patent
Kazmi et al.

(10) Patent No.: US 11,212,152 B2
(45) Date of Patent: Dec. 28, 2021

(54) HANDLING DC SUBCARRIER IN NARROW BANDWIDTH COMMUNICATIONS

(71) Applicant: Telefonaktiebolaget LM Ericsson (publ), Stockholm (SE)

(72) Inventors: Muhammad Kazmi, Bromma (SE); Ali Behravan, Stockholm (SE); Johan Mikael Bergman, Stockholm (SE); Gary Boudreau, Kanata (CA); Anders Wallén, Ystad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 181 days.

(21) Appl. No.: 16/678,077

(22) Filed: Nov. 8, 2019

(65) Prior Publication Data

US 2020/0076663 A1    Mar. 5, 2020

Related U.S. Application Data

(62) Division of application No. 15/562,476, filed as application No. PCT/EP2016/058318 on Apr. 15, 2016, now Pat. No. 10,505,776.

(Continued)

(51) Int. Cl.
*H04L 27/26* (2006.01)
*H04L 5/00* (2006.01)

(52) U.S. Cl.
CPC ........ *H04L 27/2647* (2013.01); *H04L 5/0007* (2013.01); *H04L 5/0044* (2013.01); *H04L 5/0053* (2013.01)

(58) Field of Classification Search
CPC . H04L 27/2647; H04L 5/0007; H04L 5/0044; H04L 5/0053; H04L 5/0037; H04L 5/0032; H04L 7/041
See application file for complete search history.

(56) References Cited

U.S. PATENT DOCUMENTS

2015/0016331 A1* 1/2015 Kim ...................... H04J 11/005
370/312
2015/0181603 A1* 6/2015 Wakabayashi .... H04W 72/0486
370/329

(Continued)

FOREIGN PATENT DOCUMENTS

CN       102448176 A      5/2012
CN       102447662 B     10/2014

(Continued)

OTHER PUBLICATIONS

Ericsson, et al., "New WI Proposal: Further LTE Physical Layer Enhancements for MTC," Document for: Approval, Agenda Item 14.1.1, 3GPP TSG RAN Meeting #65, RP-141660, Edinburgh, Scotland, Sep. 9, 2014, pp. 1-9.

*Primary Examiner* — Thai Nguyen
(74) *Attorney, Agent, or Firm* — Sage Patent Group

(57) ABSTRACT

According to some embodiments, a user equipment (UE) and a method in the UE are disclosed. The UE is served by a cell managed or served by a network node. The UE comprises processing circuitry, a transceiver coupled to the processing circuitry, and memory containing instructions executable by the processing circuitry. The UE is operative to determine that a center frequency of a radio frequency (RF) reception bandwidth of the UE is different than a center frequency of a RF transmission bandwidth of the cell serving the UE. The UE is further operative to receive a signal from the cell serving the UE over a center subcarrier within the RF reception bandwidth of the UE, and puncture a portion of the signal received over the center subcarrier within the RF reception bandwidth of the UE.

20 Claims, 9 Drawing Sheets

Related U.S. Application Data

(60) Provisional application No. 62/150,030, filed on Apr. 20, 2015.

(56) References Cited

U.S. PATENT DOCUMENTS

| | | |
|---|---|---|
| 2015/0365926 A1 | 12/2015 | Long |
| 2016/0105803 A1 | 4/2016 | Sakhnini et al. |
| 2016/0302174 A1 | 10/2016 | Chatterjee et al. |
| 2017/0311232 A1* | 10/2017 | Yi .................. H04W 72/048 |

FOREIGN PATENT DOCUMENTS

| | | |
|---|---|---|
| WO | 2014/003612 A1 | 1/2014 |
| WO | 2015/027400 A1 | 3/2015 |

* cited by examiner

Modify reception bandwidth of a second UE such that a center frequency of the modified RF reception bandwidth of the second UE corresponds to the punctured subcarrier
302

*Figure 9A*

Move transmission of a control signal from a subcarrier that corresponds to the center frequency of the reception bandwidth of the UE to a subcarrier that does not correspond to the center frequency of the reception bandwidth of the UE
312

Inform UE that the control signal has been moved to the new subcarrier
314

*Figure 9B*

HANDLING DC SUBCARRIER IN NARROW BANDWIDTH COMMUNICATIONS

CROSS-REFERENCE TO RELATED APPLICATIONS

The present application is a divisional of U.S. patent application Ser. No. 15/562,476, filed on Sep. 28, 2017, which is a National Stage Entry of PCT International Application No. PCT/EP2016/058318, filed on Apr. 15, 2016, which claims the benefit of and priority to U.S. Provisional Patent Application No. 62/150,030, filed on Apr. 20, 2015, the disclosure and content of each of which are incorporated herein by reference in their entireties.

TECHNICAL FIELD

The present application relates to wireless communications systems, and more particularly, to allocation of radio resources to wireless communications devices.

BACKGROUND

Machine Type Communication (MTC), also referred to as Machine to Machine (M2M) communications, refers to wireless and wired communications between devices. MTC has a wide range of applications, including industrial automation, logistics, monitoring but also for control purposes.

MTC is widely used for industrial instrumentation applications in which a device, such as a sensor or meter, captures real-time data, such as temperature, inventory level, error reports, surveillance images, etc., and transmits the captured data to a data collection node. In addition to instrumentation, MTC is also being widely adopted for other applications, such as telemetry and automation.

MTC may incorporate the transmission of many types of information, including user data, signaling information, measurement data, configuration information, etc. The device size may vary from that of a wallet to that of a base station. M2M devices are quite often used for applications, such as sensing environmental conditions (e.g. temperature reading), metering or measurement (e.g. electricity usage etc.), fault finding or error detection, etc. In these applications the MTC devices are active very seldom but over a consecutive duration depending upon the type of service e.g. about 200 ms once every 2 seconds, about 500 ms every 60 minutes etc. The MTC device may also do measurement on other frequencies or other Radio Access Technologies (RATs).

One category of MTC devices is referred to as "low cost devices." For example, a cost reduction can be realized by relaxing the requirements on peak rate and receiver performance LTE Release 12 introduces a low cost user equipment (UE) category called UE category 0 with a relatively low peak rate of 1 Mbps and relaxed performance requirements that can be fulfilled having just a single antenna receiver in the UE. The cost can be further reduced by supporting only half duplex frequency division duplexing (FDD) capability instead of full duplex FDD capability. The latter feature prevents the need for having duplex filter since UE does not transmit and receive at the same time.

The RF bandwidth (BW) of the legacy LTE UE is 20 MHz. In legacy LTE systems, the UE reception BW and cell transmission BW have the same center frequencies. Similarly, in legacy LTE system, the UE transmission BW and cell reception BW have the same center frequencies. However, cost reduction may be achieved by having a reduced UE RF bandwidth. For example, for LTE Release 13, cost reduction may be realized by having a reduced UE RF bandwidth of 1.4 MHz comprising six (6) resource blocks (RBs).

For MTC UEs with reduced RF bandwidth (1.4 MHz) the UE can be scheduled with up to 6 physical resource blocks (PRBs) in any part of the cell BW if the cell BW is larger than 1.4 MHz. A minimum allocation of 1 PRB for both the uplink (UL) and downlink (DL) can be supported. For example, if there are 5 MTC UEs in the same cell of 20 MHz BW. Then one can be configured in the center of the cell BW, with 2 UEs on the lower part of the cell BW and the remaining 2 UEs on the upper part of the cell BW.

Furthermore, the frequency of the MTC UE can also be re-tuned to support frequency multiplexing of users and to support frequency hopping across the cell BW. For example, a UE configured at a lower portion of the cell BW in a certain frame or subframe can be re-tuned to another part of the cell BW in another frame or subframe.

Narrow bandwidth MTC operation may also be referred to as narrow band operation or narrow band MTC operation. Currently in LTE the following 6 RF bandwidths are supported: 1.4 MHz, 3 MHz, 5 MHz, 10 MHz, 15 MHz and 20 MHz.

In flexible BW operation, UEs with a narrow bandwidth (i.e. an RF BW smaller than the cell BW) can be operated by the network node configuring them in any part of the cell BW. Furthermore, the UE and cell BW may be any possible BW with a resolution of one resource block (RB). As an example, in a cell of 20 MHz, two UEs with an RF BW of 6 MHz each may be configured to operate on a lower and an upper part of the cell BW, respectively. They may also be configured to operate with partial or full overlapping of their BWs within the cell. Flexible BW operation is similar to narrow BW MTC operation, except that in the case of flexible BW operation, there can be a larger number of possible RF BWs of the UE and of the cell.

SUMMARY

A method in a network node serving a user equipment includes configuring (202) the UE in a cell to operate with a center frequency of a radio frequency, RF, reception bandwidth of the UE being different than a center frequency of an RF transmission bandwidth of the cell; puncturing (204) a subcarrier in a downlink signal that, when transmitted over the RF transmission bandwidth corresponds to the center frequency of the UE RF reception bandwidth to provide a punctured downlink signal; and transmitting (206) the punctured downlink signal to the UE through a transmitter circuit operating within the UE RF reception bandwidth.

The method may further include modifying an RF reception bandwidth of a second UE in the cell such that a center frequency of the modified RF reception bandwidth of the second UE corresponds to the punctured subcarrier.

The method may further include moving (302) transmission of a control signal from a subcarrier that corresponds to the center frequency of the reception bandwidth of the UE to a subcarrier that does not correspond to the center frequency of the reception bandwidth of the UE.

The method may further include informing (314) the UE that the control signal has been moved to the subcarrier that does not correspond to the center frequency of the reception bandwidth of the UE.

The method may further include selecting a control signal that is to be moved from a subcarrier that corresponds to the center frequency of the reception bandwidth of the UE to a subcarrier that does not correspond to the center frequency of the reception bandwidth of the UE based on a recommendation provided by the UE.

The method may further include selecting a control signal that is to be moved from a subcarrier that corresponds to the center frequency of the reception bandwidth of the UE to a subcarrier that does not correspond to the center frequency of the reception bandwidth of the UE based on a frequency of use of the control signal for performing a measurement at the UE, a frequency of transmission of the control signal, and/or a significance of the control signal.

The method may further include informing the UE that the subcarrier that corresponds to the center frequency of the UE RF reception bandwidth has been punctured.

The method may further include moving (322) transmission of a data signal from a subcarrier that corresponds to the center frequency of the reception bandwidth of the UE to a subcarrier that does not correspond to the center frequency of the reception bandwidth of the UE.

The method may further include informing (324) the UE that the data signal has been moved to the subcarrier that does not correspond to the center frequency of the reception bandwidth of the UE.

The method may further include selecting a channel state information-reference signal (CRI-RS) configuration that does not utilize the punctured subcarrier, and transmitting the CRI-RS signal to the UE.

A method in a network node serving a user equipment, UE, includes configuring (402) the UE in a cell to operate with a center frequency of a radio frequency, RF, reception bandwidth of the UE being different than a center frequency of an RF transmission bandwidth of the cell; moving (404) a control signal being transmitted by a transmitter circuit using a subcarrier that corresponds to the center frequency of the RF reception bandwidth of the UE to being transmitted using a subcarrier that does not correspond to the center frequency of the RF reception bandwidth of the UE; instructing (406) the UE to puncture the subcarrier in a downlink signal that corresponds to the center frequency of the UE RF reception bandwidth; and transmitting (408) the downlink signal to the UE through a transmitter circuit.

The UE may includes a first UE, and the method may further include modifying (412) an RF reception bandwidth of a second UE in the cell such that a center frequency of the modified RF reception bandwidth of the second UE corresponds to the center frequency of the first UE; and instructing (414) the second UE to puncture (204) the subcarrier in the downlink signal that corresponds to the center frequency of the RF reception bandwidth of the second UE.

The method may further include informing the UE that the control signal has been moved to the subcarrier that does not correspond to the center frequency of the RF reception bandwidth of the UE.

A method in a user equipment, UE, served by a cell managed or served by a network node, includes determining (212) that a center frequency of a RF reception bandwidth of the UE is different than a center frequency of the RF transmission bandwidth of the cell serving the UE; receiving (214) a signal from the cell serving the UE over the RF reception bandwidth; and puncturing (216) the portion of the signal received through a receiver circuit operating in the center subcarrier within the UE RF reception bandwidth.

The method may further include modifying one or more procedures to reduce a performance degradation of one or more radio operations that utilize or rely on one or more radio signals received over the center frequency at the UE RF receiver bandwidth.

Puncturing the portion of the signal received over the center subcarrier within the UE RF reception bandwidth may include performing a fast Fourier transform of the signal to generate a plurality of frequency bins and zeroing a frequency bin corresponding to the center subcarrier.

A network node serving a UE according to some embodiments includes a processor (820); a transceiver (810) coupled to the processor; and a memory (830) coupled to the processor, the memory including computer readable program code embodied therein that, when executed by the processor, causes the processor to perform operations including configuring (202) the UE in a cell such that a center frequency of an RF reception bandwidth of the UE is different than a center frequency of an RF transmission bandwidth of the cell; puncturing (204) a subcarrier in a downlink signal that, when transmitted over the RF transmission bandwidth corresponds to the center frequency of the UE RF reception bandwidth to provide a punctured downlink signal; and transmitting (206) the punctured downlink signal to the UE within the UE RF reception bandwidth.

The computer readable program code may further cause the processor to perform operations that include adapting transmission of one or more control/data radio signals within the UE RF reception bandwidth of the UE to avoid transmission of the control/data radio signals over the subcarrier that corresponds to the center frequency within the UE RF reception bandwidth.

A user equipment, UE, served by a cell managed or served by a network node, includes a processor (700); a transceiver (710) coupled to the processor; and a memory (720) coupled to the processor, the memory including computer readable program code embodied therein that, when executed by the processor, causes the processor to perform operations that include determining (212) that a center frequency of a RF reception bandwidth of the UE is different than a center frequency of the RF transmission bandwidth of the cell serving the UE; receiving (214) a signal from the cell serving the UE over the RF reception bandwidth; and puncturing (216) the signal received over the center subcarrier within the UE RF reception bandwidth.

The computer readable program code may further cause the processor to perform operations that include modifying one or more procedures to reduce a performance degradation of one or more radio operations that utilize or rely on one or more radio signals received over the center frequency at the UE RF receiver bandwidth.

BRIEF DESCRIPTION OF THE DRAWINGS

FIGS. 9A, 9B and 9C are flowcharts illustrating operations according to some embodiments.

DETAILED DESCRIPTION

Figure 1:
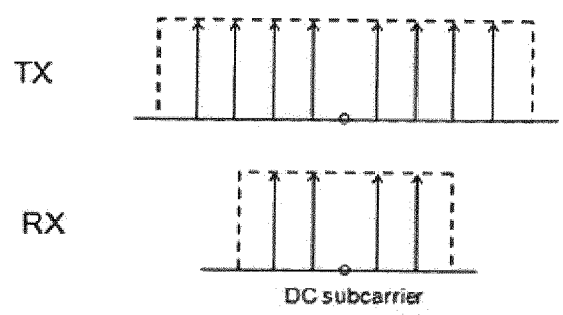
FIGS. 1 and 2 are schematic diagrams that illustrate a transmission bandwidth of a network node and a reception bandwidth of a UE.

Embodiments of the present inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments described herein provide systems and/or methods for handling the DC subcarrier, or center frequency, of a signal received by a narrow bandwidth (BW) device, i.e., where the BW of the device is less than the BW of the cell, and the received signal and the cell do not share the same center frequency.

The DC subcarrier is the subcarrier whose frequency is equal to the RF center frequency of the transmitting radio node. In the baseband signal this subcarrier corresponds to frequency zero, which means a direct current (DC) component in the baseband signal. In order to limit the magnitude of the signal which causes inefficiency in the digital to analog (D/A) and analog to digital (A/D) converters, the DC subcarrier is usually nulled.

Also in some user equipment (UE) implementations (e.g. homodyne or direct conversion receivers), when the received radio signal is down-converted to baseband, the mixing of the center frequency of the received signal and the local oscillator (LO) frequency can result in a strong direct current (DC) component being generated. This is often referred to as a DC offset or an LO leakage. It is referred to "DC" since it appears at frequency zero in a baseband representation of the signal. This DC component can be detrimental to the signal reception in several ways. For example, if the DC component is too large, it may cause the analog-to-digital conversion (ADC) of the baseband signal to saturate.

When the transmitter and the receiver have the same center frequency, by nulling the DC subcarrier at the transmitter, the DC subcarrier at the receiver will be zero as well, and the problem on both sides is solved. However, if the center frequency at the transmitter and the receiver are not the same, nulling the DC subcarrier at the transmitter does not solve the problem at the receiver.

FIG. 1 illustrates an example in which the center frequencies of the TX and RF bandwidths are aligned. Note that the DC subcarrier at the center frequency is nulled by the transmitter.

In this case, the DC subcarrier is the same for both TX and RX in a single direction (e.g., the uplink (UL) or downlink (DL)). That is, in the example illustrated in FIG. 1, although the transmitter TX has a larger bandwidth than the receiver RX, the transmitter bandwidth and the receiver bandwidth are both centered on the same center frequency. In general, however, this need not be the case. Using DL communications as an example, a transmitting base station may transmit over a bandwidth that is larger than the bandwidth of a receiving UE, which may, for example, be a narrow bandwidth M2M device. The receiving UE may be allocated subcarriers in such a manner that the center frequency of the receiver is offset from the center frequency of the transmitter.

It shall be noted that the terms "DC subcarrier" and "center frequency" are used interchangeably herein. They may refer to a system characteristic, namely corresponding to the center frequency of a carrier in a telecommunications system. In an LTE system, this may correspond to the center frequencies of the DL and UL carriers used by a base station, i.e., eNodeB (eNB). In an FDD system, the DL and UL carrier center frequencies are different, whereas in a TDD system they are equal. "DC subcarrier" and "center frequency" may also refer to an implementation specific frequency, most notably the location of the local oscillator frequency in a direct conversion receiver or transmitter.

In the following description, it is assumed that the receiver employs a direct-conversion architecture, i.e. that its center frequency and DC subcarrier coincide. For simplicity, it is also assumed that the TX refers to an LTE eNB, and the receiver refers to an LTE UE (i.e. an LTE downlink scenario), but the description applies also to other systems, scenarios and configurations.

If the center frequency of the base station (BS) transmitter and the UE receiver or the UE transmitter and the BS receiver are not the same, even though the transmitter may put zero on the DC subcarrier, the receiver will have non-zero DC subcarrier.

Figure 2:
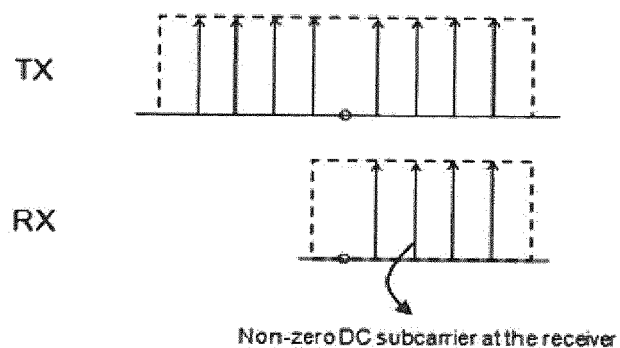

FIG. 2 illustrates an example where the center frequencies of the RF bandwidths on the TX and RX sides are not aligned. As a result, the center frequency on the RX side (corresponding to the DC subcarrier) contains a non-zero symbol.

As an example of such a scenario is the case of narrowband UEs for MTC that are planned to be introduced as part of LTE Release 13 [RP-141660]. In this case the UE bandwidth can be for example 6 physical resource blocks (PRBs) anywhere within a larger system bandwidth, and furthermore the center frequency of the UE can be different than that of the eNB, resulting in the DC subcarrier at the UE receiver being nonzero.

According to some embodiments, when the center frequencies (e.g., DC or center subcarriers) of a cell's RF transmission bandwidth and of the RF reception bandwidth of a UE configured in the cell are not the same, then a network node or the UE may puncture the center frequency at the UE RF reception BW. The network node may also adapt a transmission location of one or more predetermined signals (e.g., DMRS, etc.) in at least the frequency domain within the cell transmission BW to avoid the puncturing of the predetermined signals. The UE may also adopt one or more procedures to reduce the performance loss of one or more operations which use the radio signals received over the center subcarrier. The network node may also inform the UE as to whether or not the UE is allowed to puncture the center subcarrier.

Figure 3:
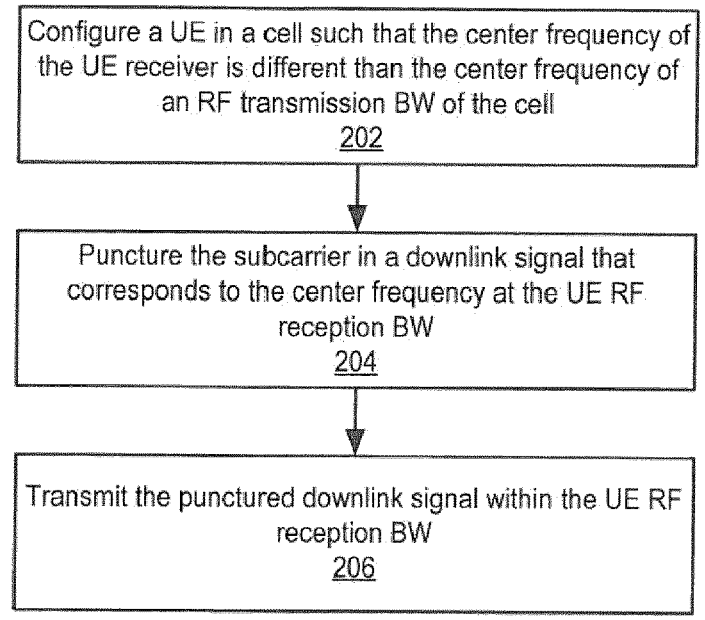
FIGS. 3 and 4 are flowcharts illustrating operations according to some embodiments.

Referring to FIG. 3, some particular embodiments provide a method in a network node serving a UE. The method as implemented in a network node includes configuring a UE in a cell such that the center frequency of the UE receiver is different than the center frequency of an RF transmission BW of the cell (block 202), puncturing the subcarrier which corresponds to the center frequency at the UE RF reception BW (block 204), and transmitting the adapted radio signals within the UE RF reception BW (block 206).

In some embodiments, the method may include adapting one or more radio signals within the UE RF reception BW based on one or more criteria transmission. The adaptation may avoid the transmission of predetermined radio signals over the subcarrier which corresponds to the center frequency within the UE RF reception BW.

Figure 4:
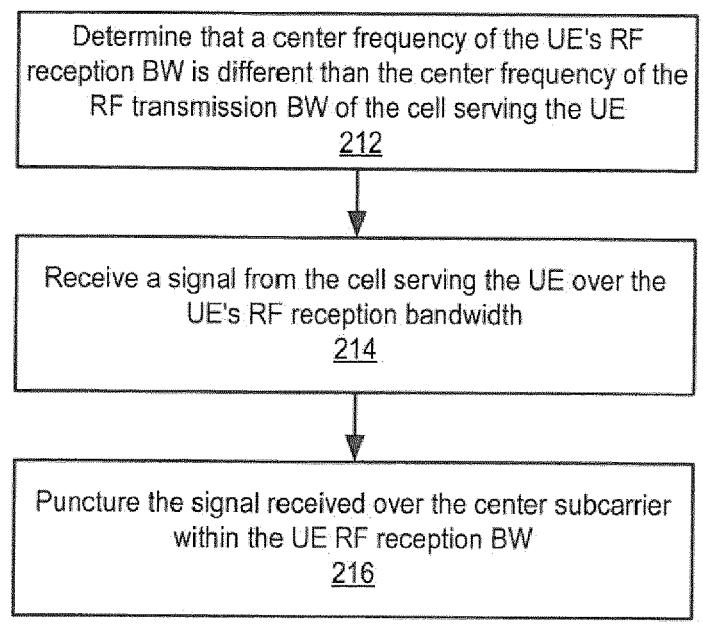

Some embodiments provide a method in a UE served by a cell managed or served by a network node. Referring to FIG. 4, the method as implemented in a UE includes determining that a center frequency of the UE's RF reception BW is different than the center frequency of the RF transmission BW of the cell serving the UE (block 212), receiving a signal from the cell serving the UE over the UE's RF reception bandwidth (block 214), and puncturing or nulling the signal received over the center subcarrier within the UE RF reception BW (block 216).

These embodiments may further include adapting one or more procedures at the UE to reduce or minimize performance degradation of one or more radio operations that utilize or rely on one or more radio signals received over the center frequency at the UE RF receiver BW.

By transmitting/receiving signals in this manner, some embodiments may enable the use of UEs having an RF bandwidth that is smaller than the RF BW of the system (i.e. serving cell) in manner that can be operated efficiently.

Some embodiments may provide more freedom in using wireless devices of different RF bandwidths within the same cell with more freedom in terms of scheduling. For example, UEs can be configured in different parts of the cell bandwidth. This can be realized without adding more complexity on the hardware side due to dynamic range in the analog to digital (A/D) conversion of the UE.

Furthermore, some embodiments can be implemented in such a way that the performance of radio operations that use signals received over the center frequency (e.g. DC subcarrier) of the UE RF reception BW are not degraded, or the degradation, if any, is reduced or minimized.

Figure 5:
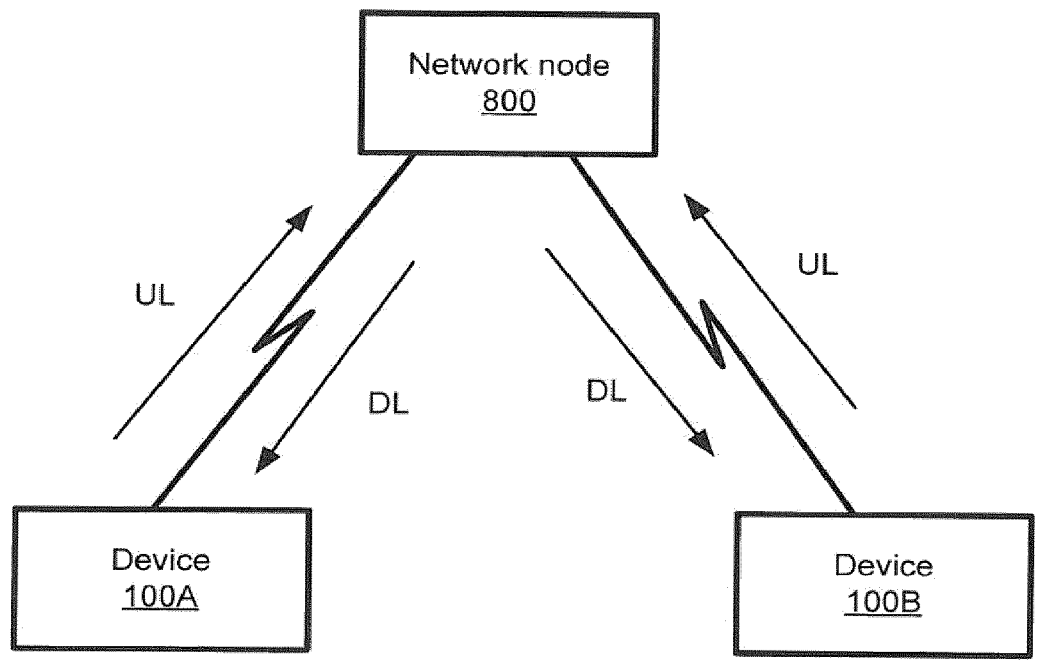
FIG. 5 is a block diagram illustrating a network node and transceivers that are configured according to some embodiments.

FIG. 5 is a schematic diagram illustrating a communication system in which two UEs 100A, 100B communicate with a network node 800A. In this description, a more general term "network node" may be used instead of "base station" or "eNodeB." A network node can correspond to any type of node in a radio network that communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc.

In some embodiments the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles etc.

In some embodiments, the term "radio node" may be used to refer to a radio network node or a UE. Thus, in the example illustrated in FIG. 5, both the devices 100A, 100B and the network node 800 are radio nodes.

The terms cell bandwidth (BW), system BW, channel bandwidth, RF system bandwidth, cell transmission BW, cell reception BW, cell operational BW, full BW, full cell or system BW are used interchangeably and have the same meaning. Each of these terms refers to the BW of cell when operating over the full BW of the cell, e.g. using the maximum number of available physical channels, such as RBs. For example, an RF BW of 10 MHz may contain 50 RBs. The RF BW of a channel is typically expressed in units of frequency e.g. Hz, MHz, etc. The channel BW is expressed in terms of a number of channels, e.g. RBs, PRBs, VRBs, etc. For example, an RF BW of 1.4 MHz may correspond to a channel BW of 6 RBs.

Accordingly, a narrow BW device may have fewer channels (e.g. 6 RBs) than that available within the full BW (e.g. 50 RBs). A flexible BW system may have fewer channels (e.g. 30 RBs) than are available within the full system BW (e.g. 100 RBs). The embodiments described herein apply to any narrow BW operation or narrow RF BW, i.e. narrower RF BW of a UE compared to the system or cell RF BW. The terms narrow BW, narrow RF BW, narrow BW for MTC, flexible BW, flexible RF BW, restricted BW, restricted RF BW, smaller BW or smaller RF BW etc., may be used interchangeably and have the same meaning.

A resource block (RB) is one particular example of a physical channel. Non-limiting examples of physical channels are time-frequency resource, radio channels, resource elements (REs), physical resource blocks (PRBs), resource blocks (RBs), virtual resource blocks (VRBs), etc.

Examples of signals that are intended to be received at the UE include the physical channel and physical signals. A physical channel carries higher layer information, e.g. user data, RRC signaling, etc. A physical signal carriers or is encoded with a physical layer signals such as reference signals, physical cell ID etc. Examples of physical channels are data channel (e.g. PDSCH), control channels (e.g. PDCCH, EPDCCH, PHICH, PCFICH etc), common channel (e.g. PBCH) etc. Examples of physical signals are reference signals or pilot signals (e.g. CRS, PRS, discovery signals, PSS, SSS, CSI-RS, DMRS, MBSFN RS etc).

Examples of signals or channels whose interference from one or more interfering cells at the UE can be mitigated by the UE in LTE are PDSCH, PDCCH, PCFICH, PCFICH, EPDCCH, PBCH, CRS, PRS, etc.

Example embodiments set forth herein are described for a single carrier (i.e., single carrier operation of the UE) in a network node. However, the embodiments are also applicable for multi-carrier or carrier aggregation (CA) operation of the UE, i.e., when network node transmits and/or plurality of serving cells on different carriers (aka CCs) to the same UEs. The serving cell on PCC is referred to as the primary cell (PCell), whereas the serving cell on SCC is referred to as the secondary cell (SCell). Dual connectivity (DC) is a special case of CA where the CCs assigned to the UE operate from different base station sites, e.g. different eNode Bs (aka, master eNB (MeNB) and secondary eNB (SeNB)). At least one serving cell in MeNB, called the PCell, and one serving cell in SeNB, called the PSCell, contain both UL and DL. The embodiments shall apply to each carrier in UL and/or DL in DC or CA.

1. Method in a Network Node to Null Subcarriers Corresponding to the Center Subcarriers of the UE Receiver RF Bandwidth In a first method according to embodiments of the inventive concepts, the network node may not send any signal in the subcarrier that will correspond to the center frequency of the receiver RF bandwidth of the UE. This is referred to herein as zeroing a subcarrier or nulling a subcarrier. This approach is based on the knowledge, at the network node, of the receiver RF bandwidth of the UE. To determine the subcarrier to be nulled, the transmitting network node determines whether or not the center subcarrier of the UE RF receiver is different than the center subcarrier of the cell RF transmitter. If their center frequencies are not the same then the network node nulls the subcarrier within its transmit bandwidth that is received as the center subcarrier by the UE RF receiver. The network node may apply the same method for all the UEs whose RF receivers are not tuned in the center frequency of the RF transmitter of the network node.

Figure 6:
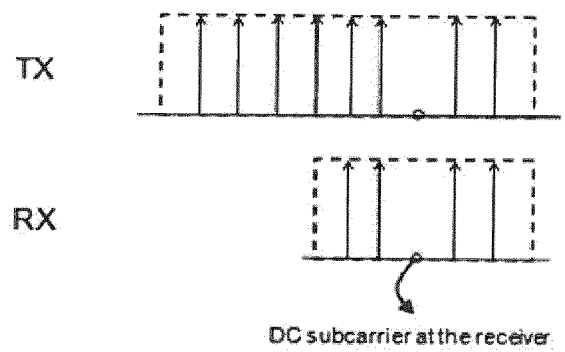
FIGS. 6, 7 and 8 are schematic diagrams that illustrate a transmission bandwidth of a network node and a reception bandwidth of one or more UEs.

FIG. 6 shows an example of a case where a network node deliberately puts a zero at the subcarrier that corresponds to the DC subcarrier at the UE receiver side.

This embodiment guarantees a zero subcarrier at the receiver side. In addition, although not illustrated in FIG. 6, the DC subcarrier at the transmitter side may also be nulled as is done, for example, in the current LTE downlink signal.

The method can be done on as many subcarriers corresponding to the number of UEs as are scheduled in a given subframe within the cell bandwidth. This means that several subcarriers may carry zero in all symbols containing such subcarriers to avoid DC subcarrier problem in multiple UEs. This will allow the UE to receive signals from the base station using existing techniques, i.e. using the same receiver as when the UE receiver is tuned at center of cell BW. However, there may be performance degradation at the UE if the center subcarrier which is nulled contains important data or control signals.

A pre-defined rule may be specified stating that the network node will puncture the subcarrier corresponding to the center frequency of the UE RF receiver BW. Alternatively, the UE may be informed whether the network node or UE has to puncture the center subcarrier.

2. Method in a Network Node of Adapting Configuration to Avoid Control/Data Signals Coinciding with Center Subcarrier at UE RF Receiver In this embodiment it is assumed that either the network node or the UE may null the center frequency at the UE RF receiver. If the center frequency of the UE RF receiver contains signals specifically provided to support one or more operations, then the performance of such operations may be degraded by puncturing at the transmitter. Examples of signals that are transmitted by the network node and used by the UE receiver for particular operations are control signals, common channel signals (e.g. PBCH etc) and reference signals (e.g. CRS, PRS, PSS, SSS, DMRS etc).

For example, if several subcarriers carrying Cell-specific Reference Signals (CRS) used for mobility measurements such as RSRP and RSRQ (which are power and quality measurements, respectively) are punctured, then the measurement results may incorporate large errors. Therefore, a mobility decision may be erroneous, e.g. a handover may be performed to a cell that is not necessarily the strongest cell in terms of signal strength and/or signal quality. In yet another example, if several subcarriers carrying PRS used for positioning measurements are punctured or nulled, then the measurement results may incorporate large error. This in turn will cause a larger error in the positioning of the UE.

However, puncturing one subcarrier at the UE may result in a certain loss in performance. If the punctured subcarrier carries a data symbol (e.g. PDSCH), removing one such symbol usually results in minor performance loss e.g. SNR degradation by 0.5 dB or less.

Figure 7:
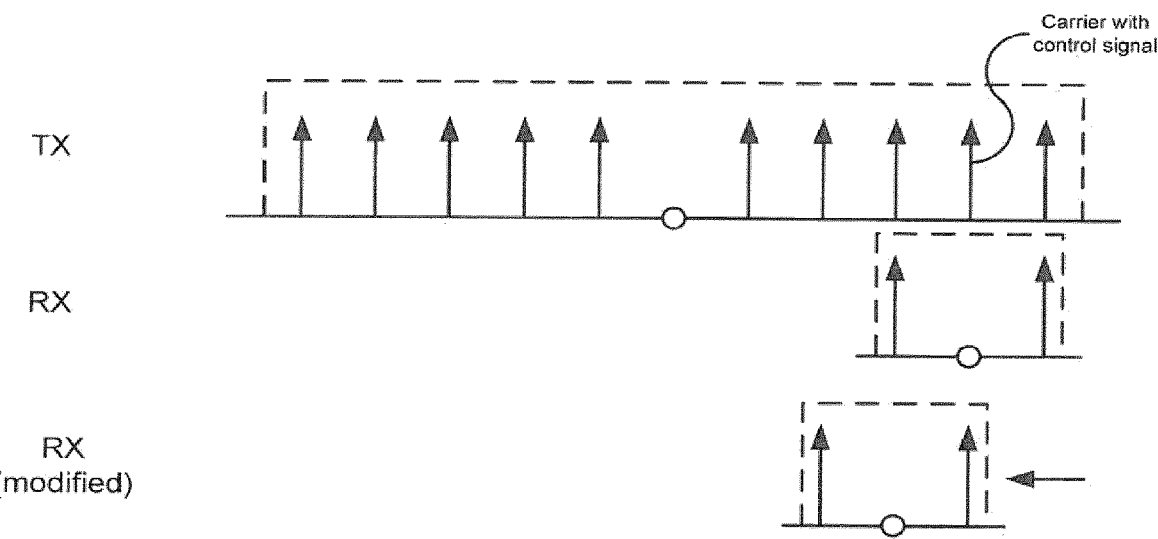

To avoid performance degradation due to nulling of control/data signals, the network node may adapt the configuration of the network node and/or the UE. The following three mechanisms may apply such adaptations:

a. Adaptation of signals coinciding with the center subcarrier at the UE RF receiver. Data/control signals that would otherwise fall at the center subcarrier of the UE RF receiver may be moved to other subcarriers.

b. Adaptation of UE RF receiver bandwidth within the cell BW to avoid overlapping between control/data signals and the center subcarrier at UE RF receiver. The bandwidth of the UE RF receiver may be modified to move the center subcarrier at the UE RF receiver away from subcarriers carrying particular control/data signals. This approach is illustrated, for example, in FIG. 7. As shown therein, a center frequency of a receiver bandwidth may correspond to a subcarrier on which a particular control/data signal is carried. The network node may adapt the UE receiver bandwidth or assigned RBs so that the center frequency of the UE receiver bandwidth is no longer aligned with the subcarrier that carries the control/data signal. The receiver may then null its center frequency without loss of the desired control/data signal.

Figure 8:
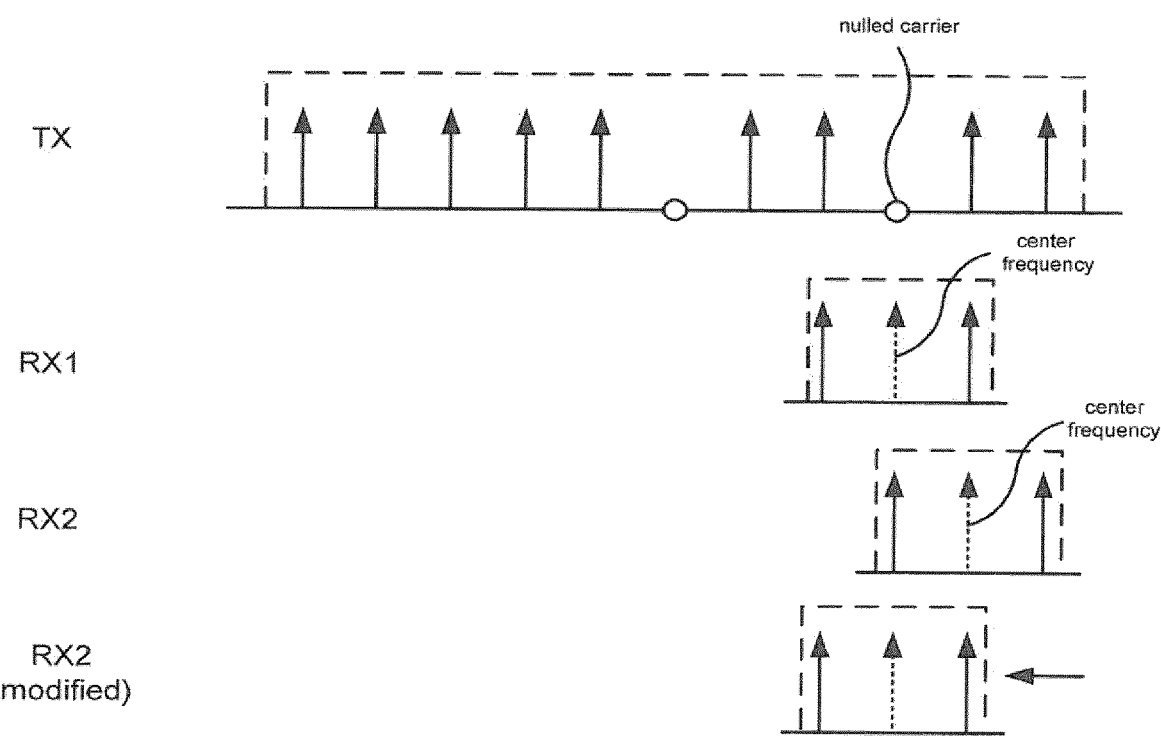

FIG. 8 illustrates an embodiment in which the network node nulls a transmission carrier. The punctured (or nulled) subcarrier may correspond to the center frequency of the bandwidth RX1 of a first UE, but not with the bandwidth RX2 of a second UE. The network node may modify the receiver bandwidth or assigned RBs of the second UE such that the center frequency of the modified bandwidth is aligned with the punctured subcarrier. This approach is further illustrated in the block diagram of FIG. 9A, which illustrates that a network node may modify the reception bandwidth of a second UE such that a center frequency of the modified RF reception bandwidth of the second UE corresponds to the punctured subcarrier (block 302).

c. A Combination of Adaption of Control/Data Signals and UE RF Receiver BW.

2.1 Method in a Network Node of Adapting Transmission of Control/Data Signals Coinciding with Center Subcarrier at UE RF Receiver As noted above, in order to reduce or minimize performance degradation due to nulling of control/data signals, the network node may adapt the configuration of one or more signals such that they are not mapped to the center subcarrier at the RF receiver of the UE. Some of such important signals can be reference signals such as cell-specific reference signals (CRS), channel state information reference signal (CSI-RS), demodulation reference signal (DMRS), positioning reference signal (PRS), or other important information such as control information, etc. For example, the network node may deliberately configure one or more control/data signals (e.g. DMRS) at a location in the cell BW such that they do not appear at the center frequency of the UE RF receiver BW.

In another example, for a UE with certain known RF receiver bandwidth, the network node selects and configures only those CSI-RS configurations in the cell that do not coincide with the center subcarrier of the UE RF receiver BW.

Figure 9C:
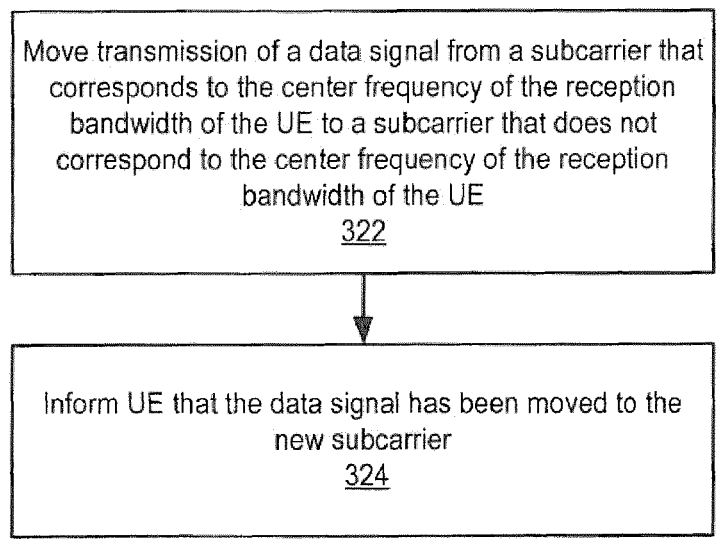

This approach is illustrated in the block diagram of FIG. 9B. As shown therein, a network node may move transmission of a control signal from a subcarrier that corresponds to the center frequency of the reception bandwidth of a UE to a subcarrier that does not correspond to the center frequency of the reception bandwidth of the UE (block 312). The network node may inform the UE that the control signal has been moved to the new subcarrier (block 314). Similarly, FIG. 9B illustrates that the network node may move transmission of a data signal from a subcarrier that corresponds to the center frequency of the reception bandwidth of a UE to a subcarrier that does not correspond to the center frequency of the reception bandwidth of the UE (block 322). The network node may inform the UE that the data signal has been moved to the new subcarrier (block 324).

The network node may also decide one or more particular type of control/data signals, which should be prevented from coinciding with the center subcarrier of the UE RF receiver, based on one or more criteria. Examples of criteria include:

a. Frequency of using the control/data signals for an operation, e.g. CRS are regularly used for RSRP and RSRS measurements. Therefore, UE should be tuned to avoid CRS collision with center RF receiver subcarrier.

b. Density of control/data signals in time and/or frequency, e.g. CSI-RS may be transmitted sparsely. Signals which are not so dense may be mapped away from the center subcarrier of the UE RF receiver.

c. Significance of operation, e.g. PRS used for positioning for control/data services. Signals which are used by the UE for more control/data purposes such as PRS may be mapped away from the center subcarrier of the UE RF receiver. PRS are used by the UE for performing RSTD measurement which in turn is used for determining UE location under emergency services.

d. Recommendation or indication received from the UE. For example, the UE may identify one or more control/data signals that the UE does not want to be received over the center subcarrier. The UE may recommend this to the network node by sending an explicit indication to the network node. For example, the UE may recommend those control/data signals which are more frequently used or used for control/data operation, e.g. DMRS for channel estimation, PRS for positioning etc., not be mapped to the center frequency.

2.2 Method in a Network Node of Tuning UE RF Receiver BW to Avoid Control/Data Signals Coinciding with Center Subcarrier at UE RF Receiver In this mechanism in order to reduce or minimize performance degradation due to nulling of control/data signals, the network node adapts the location of the UE RF receiver BW within the cell BW. This is realized by configuring the UE receiver in the cell such that the center subcarrier frequency of the UE RF receiver does not coincide with any control/data signal or may coincide with a least or acceptable number of control/data signals transmitted by the network node.

Figure 10A:
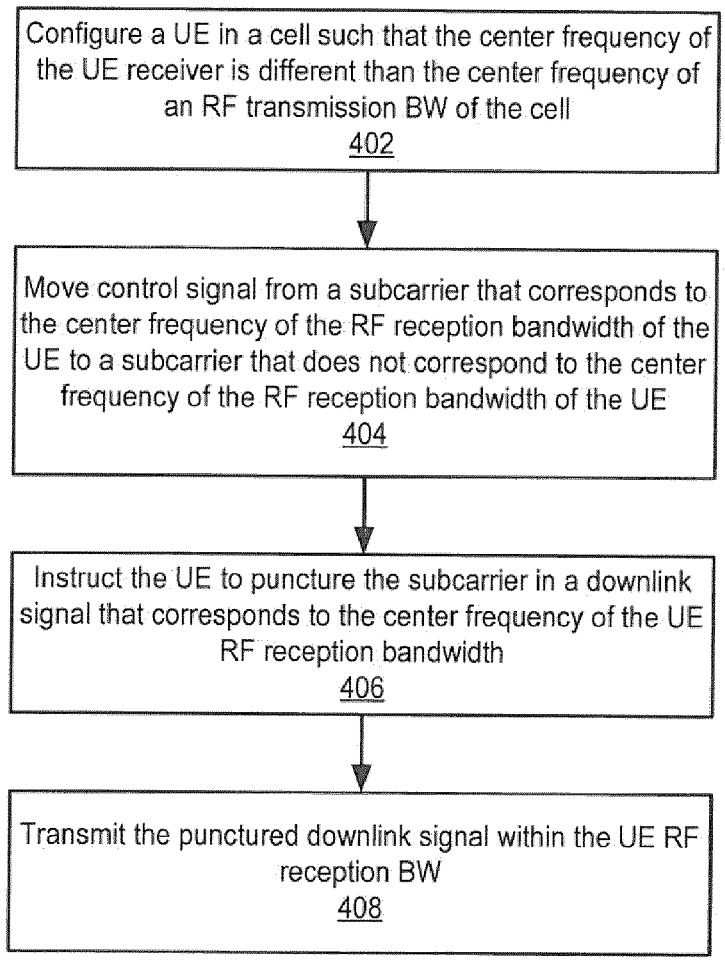
FIGS. 10A and 10B are flowcharts illustrating operations according to some embodiments.

For example, as illustrated in FIG. 10A, a network node may configure a UE in a cell such that the center frequency of the UE receiver is different than the center frequency of an RF transmission BW of the cell (block 402). The network node may move control signals from a subcarrier that corresponds to the center frequency of the RF reception bandwidth of the UE to a subcarrier that does not correspond to the center frequency of the RF reception bandwidth of the UE (block 404), and instruct the UE to puncture the subcarrier in a downlink signal that corresponds to the center frequency of the UE RF reception bandwidth (block 406). The network node may then transmit the punctured downlink signal within the UE's RF reception bandwidth (block 408).

Figure 10B:
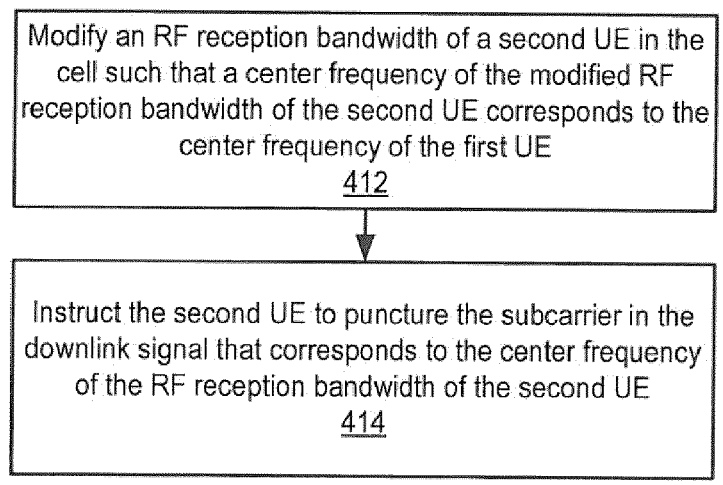

In some embodiments, as illustrated in FIG. 10B, the network node may modify an RF reception bandwidth of a second UE in the cell such that a center frequency of the modified RF reception bandwidth of the second UE corresponds to the center frequency of the first UE (block 412) and instruct the second UE to puncture the subcarrier in the downlink signal that corresponds to the center frequency of the RF reception bandwidth of the second UE (block 414).

The network node may also identify one or more particular type of control/data signals that should be mapped away from the center subcarrier of the UE RF receiver, by the virtue of tuning or retuning the UE RF receiver BW within the cell BW. Examples of criteria are the same as described in section 2.1.

2.3 Combination of Tuning UE RF Receiver BW and Adaptation of Transmission of Control/Data Signals In this combined mechanism the network node may apply both mechanisms described in sections 2.1 and 2.2. The network node may apply the combined mechanism in case only one of the methods cannot avoid the collision of all or certain desired control/data signals with UE the center subcarrier of the UE RF receiver BW.

3. Method in a UE to Puncture the Center Subcarrier at the Receiver

In this embodiment the network node may send a non-zero symbol on the center subcarrier, which is punctured by the UE when received at the UE RF receiver. In this embodiment therefore the network node may perform the normal subcarrier mapping meaning that it does not puncture the subcarrier corresponding to the DC subcarrier in the receiver, but instead the UE punctures the DC subcarrier. This can for example be done using a high pass analog filter which attenuates the DC component. Another possible method is to let the received signal enter the ADC converter of the receiver without any DC compensation, subsequently perform an FFT operation, and then puncture the frequency bin corresponding to the DC subcarrier.

4. Method in a UE to Adapt Procedure(s) to Minimize Loss Due to Puncturing of the Center Subcarrier of UE RF Receiver In this embodiment it is assumed that either the network node may send a zero symbol (i.e. punctures or nulls) on the subcarrier corresponding to the center subcarrier at the UE RF receiver or the UE may puncture the center subcarrier at the UE RF receiver. This can be realized by suppressing, discarding or ignoring any signal received over the center subcarrier.

In this embodiment, the UE adapts one or more procedures to reduce or minimize the degradation in performance of one or more operations using signals that are lost, destroyed or otherwise affected due to the nulling of the center subcarrier. Examples of such operations performed by the UE that may be adapted include channel estimation, synchronization, receiver timing adjustment, transmitter timing adjustment based on reception of signals, radio measurements, positioning, etc. For example, operations such as channel estimation may use reference signals which may be affected due to falling in the center subcarrier of the UE RF receiver BW. The loss of such signals may result in, for example, incorrect estimation of the channel. This in turn may degrade the data channel reception performance as it relies on the channel estimation.

Examples of procedures to reduce or minimize or limit the degradation in performance of one or more operations include:

a. In one example the UE may deliberately not use any signal that is received in the center subcarrier of its RF receiver BW for any operation. The UE may instead use signals that are received on other subcarriers. This will require the UE to adapt its receiver depending on whether the center subcarrier of the UE RF receiver contains certain control/data signals or not. For example, in the former case when taking average of the measurement samples obtained on reference signals, the UE may use only those samples which do not use any signals received in the center subcarrier of its RF receiver BW.

b. In a second example the UE may also deliberately not use any signal that is received in the center subcarrier of its RF receiver BW for any operation. However, to compensate the loss, the UE may use similar signals received in other parts of the RF reception BW for the same operation. For example, the UE may obtain more frequent samples of reference signals in time for measurement on reference signal such as CSI-RS (e.g. one sample every 20 ms instead of every 40 ms) in case one or more such reference signals received over center subcarrier are lost or discarded at the UE receiver. More frequent measurement sampling will allow the UE to use more samples for averaging and for obtaining the final measurement results with negligible or acceptable performance degradation.

c. In a third example, the UE may not use the signals received in the center subcarrier of its RF receiver BW for performing one or more operations e.g. radio measurements. However, to reduce or minimize the performance degradation, the UE may apply some compensation to the result of the performed operation. The value of compensation may be pre-defined or decided by the UE autonomously. The compensation value may also be determined by the UE implicitly based on one or more pre-defined requirements associated with the operation. The compensation value may also depend on one or more of the following: the type of signals (e.g. CRS, CSI-RS etc) used for an operation, type of operation (e.g. RSRP measurement, channel estimation, positioning measurement), density or frequency of signals in time and/or frequency used for operation. For example, the UE may apply a fixed compensation of 0.5 dB to the result of radio measurement such as RSRP when the center subcarrier of UE RF receiver coincides with CRS.

4.1 Realization of Adaption of Procedure(s) by Pre-Defined Requirements

One or more UE requirements or rules may be pre-defined to ensure that the UE adapts one or more procedures so as to reduce or minimize the performance degradation of one or more operations using signals that are lost, destroyed or otherwise affected due to the nulling of the center subcarrier. Such pre-defined requirements may also ensure that the performance degradation due to the puncturing of the center subcarrier normally used by the UE for one or more operations is reduced or is maintained within an acceptable or allowed limit.

Examples of requirements include:

a. SNR or SINR corresponding to certain bit rate or throughput (e.g. 70% of maximum value).

b. Measurement accuracy of a measurement quantity e.g. an accuracy of RSRP or RSRQ within +/−2 dB of the true measurement value.

c. Timing accuracy of a measurement quantity e.g. an accuracy of RSTD within +/−6 Ts of the true measurement value; Ts=32.55 ns.

d. Measurement period or measurement time of measurement quantity e.g. L1 period of RSRP/RSRQ, cell identification time, evaluation time of out of sync or in sync for radio link monitoring etc.

e. Number of cells for which measurements (e.g. RSRP and/or RSRQ) can be measured during the same measurement time.

Examples of pre-defined requirements or rules associated with different operations to reduce or limit degradation include:

a. In one example it may be pre-defined that if the center subcarrier within UE RF receiver BW is punctured then the UE has to meet the same requirements for an operation as defined for the same operation when the center subcarrier is not punctured. This rule will require the UE to adapt its receiver to either apply compensation to the result of the operation or avoid using signals received in the center subcarrier of its RF receiver BW. This will require the UE to have additional radio circuitry and processing resources, e.g. more memory and processing resources.

b. In another example it may be pre-defined that if the center subcarrier within the UE RF receiver BW is punctured and the punctured subcarrier is not needed or used for an operation then the UE has to meet the same requirements for the operation as defined for the same operation when the center subcarrier is not punctured.

c. In yet another example it may be pre-defined that if the center subcarrier within UE RF receiver BW is punctured and the degradation in the performance of operation is above a threshold, then the UE will not perform that operation and/or will not use or signal the results of that operation to the network node. For example, if the accuracy of the RSRP becomes more than 2 dB worse than the normal accuracy (i.e. the accuracy achieved when center subcarrier is not punctured) than the UE may not signal the RSRP results to the network node and/or not use it for an action e.g. for cell reselection, positioning etc.

d. In yet another example it may be pre-defined that if the center subcarrier within UE RF receiver BW is punctured then the UE still has to meet the requirements for an operation but with some limited degradation with respect to those defined for the same operation when the center subcarrier is not punctured. This rule will also require the UE to adapt its receiver to either apply partial compensation to the result of the operation or avoid using signal received in the center subcarrier of its RF receiver BW. This rule may not require the UE to implement or use as much extra circuitry and processing resources as in pre-defined requirement (a) above. This is further elaborated with few examples below:

For example, the UE may be allowed to meet an accuracy of +/−3 dB instead of +/−2 dB for RSRP in case the center subcarrier of the RF receiver BW is punctured.

In another example the UE may be allowed to measure RSRP and/or RSRQ of up to 6 cells over the same L1 measurement period instead of 8 cells, in case the center subcarrier of the RF receiver BW is punctured.

5. Method in a Network Node of Allowing UE to Puncture Center Subcarrier

In this embodiment the network node may configure the UE to enable the UE to puncture the center subcarrier within the UE's RF receiver BW. This configuration mechanism will ensure that either network node or UE punctures the center subcarrier but not both. The signaling configuration mechanism may be specified in different manners. This is explained with several examples below.

In one example the UE may only puncture the center subcarrier if it is explicitly permitted by the network node to puncture the center subcarrier.

In another example the UE may puncture the center subcarrier by default but such default behavior can be overridden or reversed by an explicit indication received from the network node. For example, if network node indicates that the UE is not allowed to puncture the center subcarrier then the UE will not puncture the center subcarrier regardless of the default rule or UE behavior.

In yet another example the network node may send an indicator informing the UE that the network node is or will puncture the center subcarrier. Upon receiving such indication, the UE will not puncture the center subcarrier or stop puncturing the center subcarrier if the UE as doing so.

In yet another example the network node allows the UE to puncture the center subcarrier provided only certain types of signals are transmitted on the center carrier by the network node, e.g. a data channel such as PDSCH. The network node may also forbid the UE from puncturing certain type of control/data signals sent on the center subcarrier, e.g. signals such as CRS which cannot easily be reconfigured at a different location in frequency within the cell transmission BW.

The network node may also decide whether or not to permit the UE to puncture the center subcarrier within the UE's RF receiver BW based on one or more criteria. Examples of such criteria include:

a. The number of UEs configured with the same center subcarrier in the same cell. In this case in one example if the puncturing of the center subcarrier of all the UEs is feasible then the network node may decide to puncture the center subcarrier of the UEs itself. But in case the network node only wants to allow a subset number of UEs to puncture their center subcarriers, then the network node configures the UE with explicit indication, i.e. whether a certain UE is allowed or not to puncture the center subcarrier.

b. Processing capability in network node. The network node would require extra resources to puncture the center subcarrier. If there is a large number of UEs with different center subcarriers in the cell, then puncturing of the center subcarrier may consume more resources in the network node. In this case the network node may only selectively puncture the center subcarrier itself and may configure the remaining UEs to puncture their respective center subcarriers.

c. UE capability of puncturing center subcarrier. All UEs may not be capable of puncturing their own center subcarrier. For such UEs the network node may itself puncture the center subcarrier. The network node may only configure UEs which are capable of puncturing their center subcarrier, to puncture their respective center subcarrier. The network node may determine the UE capability based on an explicit indication (e.g. UE capability information) received from the UE. The UE capability information may further indicate that the UE is capable of performing one or more radio operations (e g channel estimation, measurement etc) and meet the corresponding pre-defined requirements even if one or more radio signals used for such operations are received over the center subcarrier of the UE's RF receiver BW.

Figure 11:
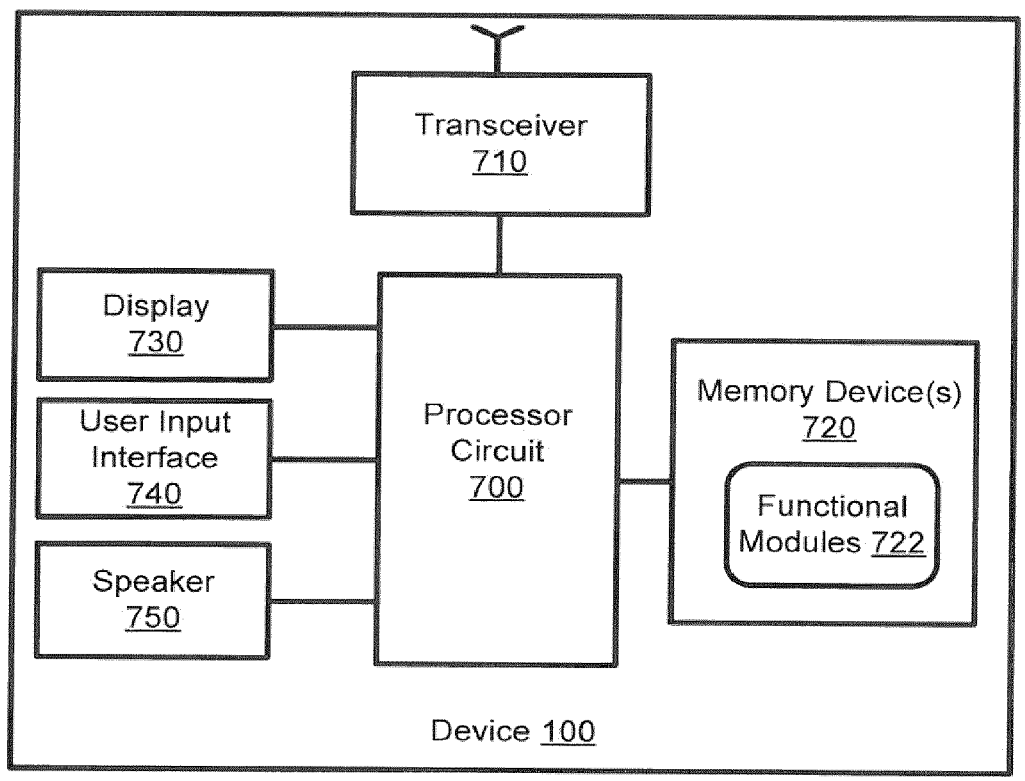
FIG. 11 is a block diagram of a device that is configured to perform operations according to one or more embodiments.

FIG. 11 is a block diagram of a device 100 that is configured to perform operations according to one or more embodiments disclosed herein. The device 100 includes a transceiver(s) 710, a processor circuit(s) 700 (referred to as processor for brevity), and a memory device(s) 720 (referred to as memory for brevity) containing functional modules 722. The device 100 may further include a display 730, a user input interface 740, and a speaker 750.

The transceiver 710 is configured to communicate with a network node through a wireless air interface using one or more of the radio access technologies disclosed herein. The processor 700 may include one or more data processing circuits, such as a general purpose and/or special purpose processor, e.g., microprocessor and/or digital signal processor. The processor 700 is configured to execute computer program instructions from the functional modules 722 of the memory 720 to perform at least some of the operations described herein as being performed by a UE.

Figure 12A:
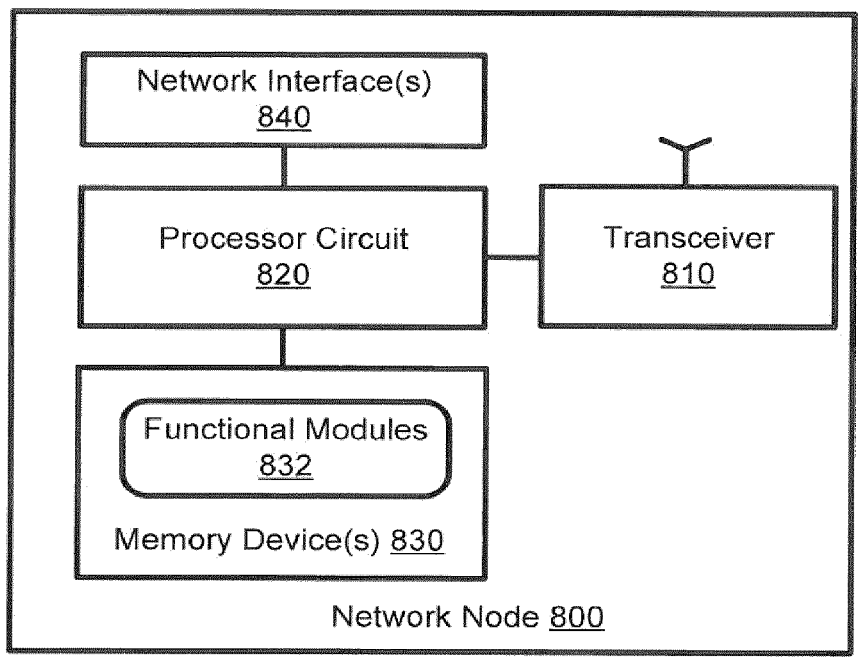
FIG. 12A is a block diagram of a network node that is configured according to one or more embodiments.

FIG. 12A is a block diagram of a network node 800 that is configured according to one or more embodiments disclosed herein for a radio network node, an access node, or other network node. The network node 800 can include a transceiver 810, a network interface(s) 840, a processor circuit(s) 820 (referred to as processor for brevity), and a memory device(s) 830 (referred to as memory for brevity) containing functional modules 832.

The transceiver 810 is configured to communicate with the UE 100 using one or more of the radio access technologies disclosed herein, when the network node 800 is a radio network node. The processor 820 may include one or more data processing circuits, such as a general purpose and/or special purpose processor, e.g., microprocessor and/or digital signal processor, that may be collocated or distributed across one or more networks. The processor 820 is configured to execute computer program instructions from the functional modules 832 of the memory device(s) 830 to perform at least some of the operations and methods of described herein as being performed by a network node. The network interface 840 communicates with other network nodes and/or a core network.

Figure 12B:
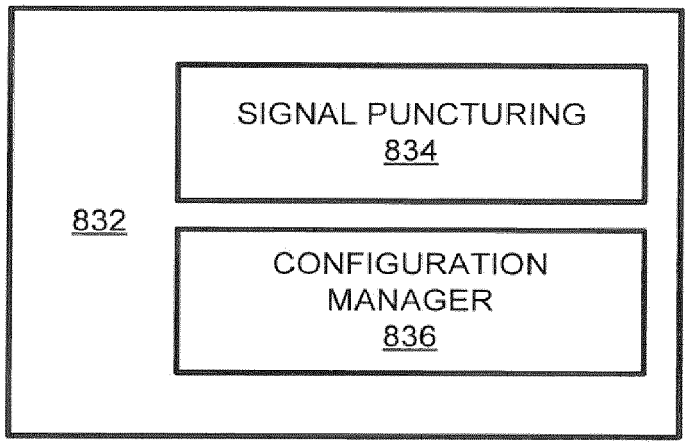
FIG. 12B is a block diagram that illustrates the functional modules in a memory of a network node that is configured according to one or more embodiments.

FIG. 12B is a block diagram that illustrates the functional modules 832 of the memory 830 in more detail. As shown therein, the functional modules 832 may include a signal puncturing module 834, a node configuration manager 836 and a UE configuration manager 838. Although illustrated in FIG. 8B as residing within the same network node, it will be appreciated that the signal puncturing module 834, node configuration manager 836 and UE configuration manager 838 can be implemented in separate network nodes. The signal puncturing module 834 punctures a signal to null or remove a subcarrier corresponding to the center frequency of an RF BW of a UE prior to transmission. The node configuration manager 836 controls the configuration of the network node 800 and may configure or adapt the network node 800 as described above to adapt the transmission of one or more control/data radio signals within the UE RF reception BW in a manner that reduces or avoids the transmission of the radio signals over the subcarrier that corresponds to the center frequency within the UE RF reception BW. The UE configuration manager 838 may provide instructions to a UE to adapt its configuration to reduce or minimize performance degradation of one or more radio operations that utilize or rely on one or more radio signals received over the center frequency at the UE RF receiver BW.

ABBREVIATIONS

Explain all abbreviations and acronyms used in the document.
Abbreviation Explanation
ADC Analog-to-digital converter
BS Base Station
CID Cell Identity
CRS Cell-specific Reference Signal
DL Downlink
FOM Figure of Merit
ID Identity
L1 Layer 1
L2 Layer 2
LTE Long Term Evolution
M2M Machine to Machine
MAC Medium Access Control
MDT Minimization of drive test
MTC Machine Type Communication
OFDM Orthogonal Frequency Division Multiplexing
PDCCH Physical Downlink Control Channel
PDSCH Physical Downlink Shared Channel
PHICH Physical Hybrid ARQ Indicator Channel
PSS Primary Synchronization Signal
RAT Radio Access Technology
RE Resource Element
RB Resource Block
RRM Radio Resource Management
RSRQ Reference signal received quality
RSRP Reference signal received power
SSS Secondary Synchronization Signal
UE User Equipment As will be appreciated by one of skill in the art, the present inventive concepts may be embodied as a method, data processing system, and/or computer program product. Furthermore, the present inventive concepts may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

What is claimed is:

1. A method in a user equipment (UE) served by a cell managed or served by a network node, the method comprising:
    determining that a center frequency of a radio frequency (RF) reception bandwidth of the UE is different than a center frequency of a RF transmission bandwidth of the cell serving the UE;
    receiving a signal from the cell serving the UE over a center subcarrier within the RF reception bandwidth of the UE; and
    puncturing a portion of the signal received over the center subcarrier within the RF reception bandwidth of the UE.

2. The method of claim 1, further comprising adapting one or more procedures to reduce a performance degradation of one or more radio operations that utilize or rely on one or more radio signals received over the center frequency of the RF reception bandwidth of the UE.

3. The method of claim 2, wherein adapting the one or more procedures to reduce the performance degradation is based on pre-defined rules associated with the one or more radio operations.

4. The method of claim 3, wherein adapting the one or more procedures based on the pre-defined rules comprises:
    applying a value of compensation to a result of the one or more radio operations; or
    using a signal that does not correspond to the signal received from the cell over the center subcarrier.

5. The method of claim 1, further comprising:
    identifying a control signal based on a frequency of use of the control signal, a frequency of transmission of the control signal, or a significance of the control signal; and transmitting an indication of the identified control signal to the network node.

6. The method of claim 5, further comprising receiving information from the network node that the identified control signal has been moved from the center subcarrier that corresponds to the center frequency of the RF reception bandwidth of the UE to a subcarrier that does not correspond to the center frequency of the RF reception bandwidth of the UE.

7. The method of claim 5, wherein the signal received from the cell is different from the identified control signal.

8. The method of claim 1, wherein puncturing the portion of the signal received over the center subcarrier comprises performing a fast Fourier transform of the signal to generate a plurality of frequency bins and zeroing a frequency bin corresponding to the center subcarrier.

9. A user equipment (UE) served by a cell managed or served by a network node, the UE comprising:
processing circuitry;
a transceiver coupled to the processing circuitry; and
memory containing instructions executable by the processing circuitry whereby the UE is operative to:
determine that a center frequency of a radio frequency (RF) reception bandwidth of the UE is different than a center frequency of a RF transmission bandwidth of the cell serving the UE;
receive a signal from the cell serving the UE over a center subcarrier within the RF reception bandwidth of the UE; and
puncture a portion of the signal received over the center subcarrier within the RF reception bandwidth of the UE.

10. The UE of claim 9, wherein the UE is further operative to adapt one or more procedures to reduce a performance degradation of one or more radio operations that utilize or rely on one or more radio signals received over the center frequency of the RF reception bandwidth of the UE.

11. The UE of claim 10, wherein the UE is further operative to adapt the one or more procedures to reduce the performance degradation based on pre-defined rules associated with the one or more radio operations.

12. The UE of claim 11, wherein the UE is further operative to adapt the one or more procedures based on the pre-defined rules by:
applying a value of compensation to a result of the one or more radio operations; or
using a signal that does not correspond to the signal received from the cell over the center subcarrier.

13. The UE of claim 9, wherein the UE is further operative to:
identify a control signal based on a frequency of use of the control signal, a frequency of transmission of the control signal, or a significance of the control signal; and
transmit an indication of the identified control signal to the network node.

14. The UE of claim 13, wherein the UE is further operative to receive information from the network node that the identified control signal has been moved from the center subcarrier that corresponds to the center frequency of the RF reception bandwidth of the UE to a subcarrier that does not correspond to the center frequency of the RF reception bandwidth of the UE.

15. The UE of claim 13, wherein the signal received from the cell is different from the identified control signal.

16. The UE of claim 9, wherein the UE is operative to puncture the portion of the signal received over the center subcarrier by performing a fast Fourier transform of the signal to generate a plurality of frequency bins and zeroing a frequency bin corresponding to the center subcarrier.

17. A non-transitory computer-readable storage medium comprising instructions for configuring a user equipment (UE), the UE being served by a cell managed or served by a network node, wherein the instructions which, when run by a processor of the UE, cause the UE to:
determine that a center frequency of a radio frequency (RF) reception bandwidth of the UE is different than a center frequency of a RF transmission bandwidth of the cell serving the UE;
receive a signal from the cell serving the UE over a center subcarrier that corresponds to the center frequency of the RF reception bandwidth of the UE; and
puncture a portion of the signal received over the center subcarrier within the RF reception bandwidth of the UE.

18. The non-transitory computer-readable storage medium of claim 17, wherein the instructions further cause the UE to adapt one or more procedures to reduce a performance degradation of one or more radio operations that utilize or rely on one or more radio signals received over the center frequency of the RF reception bandwidth of the UE.

19. The non-transitory computer-readable storage medium of claim 17, wherein the instructions further cause the UE to puncture the portion of the signal received over the center subcarrier by performing a fast Fourier transform of the signal to generate a plurality of frequency bins and zeroing a frequency bin corresponding to the center subcarrier.

20. The non-transitory computer-readable storage medium of claim 17, wherein the instructions further cause the UE to receive information from the network node that a control signal has been moved from the center subcarrier that corresponds to the center frequency of the RF reception bandwidth of the UE to a subcarrier that does not correspond to the center frequency of the RF reception bandwidth of the UE to the UE within the UE RF reception bandwidth.

* * * * *